(12) United States Patent  
Nussbaum et al.

(10) Patent No.: US 8,930,754 B2  
(45) Date of Patent: Jan. 6, 2015

(54) APPARATUS AND METHOD FOR PROCESSING DATA STREAMS

(75) Inventors: Ian Nussbaum, New Malden (GB); Ian Grover, Reading (GB); Michael Gray, Reading (GB)

(73) Assignee: BAE Systems PLC, London (GB)

(\*) Notice: Subject to any disclaimer, the term of this patent is extended or adjusted under 35 U.S.C. 154(b) by 453 days.

(21) Appl. No.: 13/139,443

(22) PCT Filed: Dec. 8, 2009

(86) PCT No.: PCT/GB2009/051662  
§ 371 (c)(1),  
(2), (4) Date: Jun. 13, 2011

(87) PCT Pub. No.: WO2010/067105  
PCT Pub. Date: Jun. 17, 2010

(65) Prior Publication Data  
US 2011/0258414 A1    Oct. 20, 2011

(30) Foreign Application Priority Data

Dec. 12, 2008  (EP) .................................... 08253997  
Dec. 12, 2008  (GB) .................................. 0822627.6

(51) Int. Cl.  
*G06F 11/00* (2006.01)  
*G06F 11/20* (2006.01)  
*G06F 11/14* (2006.01)

(52) U.S. Cl.  
CPC ........ *G06F 11/2097* (2013.01); *G06F 11/2028* (2013.01); *G06F 11/203* (2013.01); *G06F 11/2038* (2013.01); *G06F 11/2048* (2013.01); *G06F 11/1443* (2013.01)

USPC ................................ 714/13; 714/4.11; 714/12

(58) Field of Classification Search  
USPC .............................................. 714/4.11, 12, 13  
See application file for complete search history.

(56) References Cited

U.S. PATENT DOCUMENTS 5,987,621 A * 11/1999 Duso et al. ................... 714/4.11  
6,023,772 A *  2/2000 Fleming ......................... 714/13  
(Continued)

OTHER PUBLICATIONS

International Search Report dated May 3, 2010 issued in PCT/GB2009/051662.

(Continued)

*Primary Examiner* — Philip Guyton  
(74) *Attorney, Agent, or Firm* — Scully, Scott, Murphy & Presser, P.C.

(57) ABSTRACT

A distributed architecture and method for maintaining the integrity of data streams within a multi-pipelined processing environment. The architecture comprising a communications network for carrying a plurality of data streams and a master processor adapted to process one or more messages in at least one of the data streams, the message processing including the creation of one or more data packets within the stream, each packet encapsulating at least a transaction summary of the data that has been processed. The architecture further comprising at least one slave processor per master processor adapted to emulate the transactional state of the master processor by regenerating the data stream as a result of processing the one or more data packets, whereupon in response to an error event on the master processor, the slave processor acts to avoid interrupting the data stream by generating one or more successive data packet(s). Hence, the architecture and method serve as a high availability, robust fault tolerant system, mitigating against the loss of data within data streams.

23 Claims, 8 Drawing Sheets

(56) References Cited

U.S. PATENT DOCUMENTS

| | | | |
|---|---|---|---|
| 6,629,271 B1* | 9/2003 | Lee et al. | 714/49 |
| 7,028,218 B2* | 4/2006 | Schwarm et al. | 714/11 |
| 7,159,234 B1* | 1/2007 | Murphy et al. | 725/87 |
| 7,178,057 B1 | 2/2007 | Heideman et al. | |
| 7,421,612 B1* | 9/2008 | Maranhao et al. | 714/4.11 |
| 2004/0153709 A1* | 8/2004 | Burton-Krahn | 714/4 |
| 2006/0271813 A1* | 11/2006 | Horton et al. | 714/4 |
| 2007/0079102 A1 | 4/2007 | Armstrong et al. | |
| 2007/0101191 A1 | 5/2007 | Iwama | |
| 2007/0143374 A1* | 6/2007 | D'Souza et al. | 707/204 |
| 2007/0266053 A1 | 11/2007 | Ahal et al. | |

OTHER PUBLICATIONS

European Search Report dated Jul. 7, 2009 issued in EP 08 25 3997.
UK Search Report dated Mar. 16, 2009 issued in GB0822627.6.
International Preliminary Report on Patentability together with the Written Opinion from PCT/GB2009/051662 dated Jun. 23, 2011.

* cited by examiner

APPARATUS AND METHOD FOR PROCESSING DATA STREAMS

The present invention relates to an apparatus and method for processing data streams, and particularly relates to a distributed architecture and method for maintaining the integrity of data streams within multi-pipelined processing environments.

There are many different architectures and systems known in the prior art for controlling the flow of data within a multi-pipelined processing environment. Such control systems process data streams according to prescribed methodologies and paradigms in order to preserve the integrity of the processed data in the event that the system should develop an error or malfunction in some way. Therefore, it is known to provide fault tolerant architectures, for example in the form of dual processors, to ensure that data can be recovered in the event of an error.

In many applications, data is processed and stored via database operations, and a common technique of preserving data during such operations is via "transaction processing". Transaction processing treats each operation on a particular piece of data as an action, or set of actions, which must be completed as a whole before the operation is regarded as having been carried out. Therefore, any changes to the data are only acknowledged by the system if the transaction has completely finished what it was instructed to do. Should an error occur within the system during an operation, the data can be "rolled back" or restored to the last known valid state prior to any incomplete transactions.

Such error recovery techniques are very well suited for preserving processed data, and consequently transaction processing is used widely within business applications and database systems generally. However, in some applications the loss of data from within a data stream (i.e. when the data is in transit) can be critical, as depending on the nature of the lost data, and form of control system, the subsequent response of the system or subsequent application logic may differ from what was intended or expected.

Therefore, for such applications it is important to preserve the flow of data within the data stream, a requirement which is generally incompatible with conventional techniques for recovering processed data. This is usually because either the existing paradigm or recovery logic is designed to restore data to its last known valid state, and consequently the paradigm/logic is typically only concerned with the "end states" of the data and not with the status of any data that is in transit.

In applications such as air traffic control and radar monitoring, data streams generally comprise a continuous series of messages derived from an associated receiving equipment. Each message typically represents some form of "triggering event" that is intended to invoke some response or action within the control system, which in itself may invoke a further response/action etc., to thereby generate a particular course of action for responding to the information conveyed in the data stream. Hence, any loss of such messages is undesirable and may be potentially hazardous, particularly where the objects being monitored are moving at high speeds.

Therefore, there is a need within the art for a control system and method that can maintain the integrity of data streams in applications were the loss of information from within the data streams is best avoided and/or is not permissible.

According to a first aspect of the present invention there is provided a distributed architecture configured to maintain the integrity of data streams within a multi-pipelined processing environment, the architecture comprising:

a communications network for carrying a plurality of data streams;

a master processor adapted to process one or more messages in at least one of the data streams, the message processing including the creation of one or more data packets within the stream, each packet encapsulating at least a transaction summary of the data that has been processed; and at least one slave processor adapted to emulate the transactional state of the master processor by regenerating the data stream as a result of processing the one or more data packets, whereupon in response to an error event on the master processor, the slave processor acts to avoid interrupting the data stream by generating one or more successive data packet(s).

According to a second aspect of the present invention there is provided a method of maintaining the integrity of data streams within a multi-pipelined processing environment, implemented across a distributed architecture, the method comprising the steps of:

carrying a plurality of data streams on a communications network;

processing, on a master processor, one or more messages in at least one of the data streams, the processing including the creation of one or more data packets within the stream, each packet encapsulating at least a transaction summary of the data that has been processed; and emulating, on at least one slave processor, the transactional state of the master processor by regenerating the data stream as a result of processing the one or more data packets, whereupon in response to an error event on the master processor, the slave processor acts to avoid interrupting the data stream by generating one or more successive data packet(s).

The present invention seeks to address some or all of the above problems in the prior art by providing a robust distributed architecture that is operated to preserve the flow of data within one or more data streams. In this way, the architecture achieves a "high availability" in terms of operational reliability, which makes the present invention ideally suited for use in both civilian and military real-time monitoring applications, such as air traffic control, air-space defence and naval operations etc.

The architecture of the present invention is distributed in the sense that the master processor and the slave processor may be remotely located from each other, and from any other processors within the architecture. By "remotely located" we mean that each processor may be physically separated and therefore need not be located in close proximity to the other or others. An advantage of implementing the invention by way of a distributed architecture, is that it increases the overall architecture's fault tolerance and resilience to potential malfunction and/or damage. Hence, should a portion of the architecture be rendered inoperative due to instantaneous equipment failure, sabotage or possible battle damage (e.g. as arising in military applications etc.), the remaining processor(s) can assume control and maintain the flow of data within the system, without any undue impact on the operational reliability or capability of the system as a whole.

It is to be understood that any number of processors may be included within the architecture depending on the particular application. Hence, the architecture of the present invention is inherently scalable. Moreover, there may be more than one master processor and more than one slave processor, and there may be more than one slave processor associated with any particular master processor, but it is most preferred that there is only one respective slave processor associated with each master processor.

The processors themselves may be conventional servers, workstations or personal computers, or alternatively, may be bespoke computing devices arranged and operated according to the architecture and method of the present invention. Moreover, it is to be appreciated that the processors may be advantageously derived from any "commercial-off-the-shelf" (COTS) hardware. Furthermore, in some arrangements, each 'processor' may correspond to a 'virtual machine', that can be executed on a single core or multiple core processor. Hence, the architecture of the present invention may be implemented with potentially significant cost-savings over existing fault tolerant systems.

Each of the processors are coupled to a communications network. The network may be a hardwire or wireless comms network. The network is preferably configured to have sufficient bandwidth to carry a plurality of data streams, each stream originating from one or more data sources, such as sensors or receiving equipment etc. In preferred arrangements, the network is configured to support and convey multi-cast data traffic, so as to enable multiple processors within the network to receive data packets via multi-cast data streams.

By "data stream" we mean a flow of data, typically comprising one or more messages, which are streamed continuously, intermittently or according to some other prescribed transmission sequence. The flow of data may be subject to some form of modulation and/or may be partly or fully encrypted according to a desired encryption standard.

References herein to a "message" are intended to include any data element that conveys an instruction to an application logic to perform/invoke some intended function. Hence, a message may be viewed as a "triggering event" to trigger some action or response within one or more of the processors.

The processors within the architecture are preferably arranged according to an inter-meshed topology, throughout which a large number of messages may be in transit at any particular moment of operation. Each processor may handle a plurality of different processing threads and can process any number of messages from within the data streams.

However, it should be appreciated that any network topology or connectivity arrangement may be used according to the present invention, without sacrificing any of the benefits or advantages of the architecture or method. Moreover, it is to be understood that the present architecture is most preferably implemented as a "soft real-time" system, whereby some degree of latency between keeping all of the distributed processors within the network up-to-date with changing situations is tolerated, without any undue effect on the overall system performance.

At least one of the processors within the network is selected to be a master processor, with one or more second processors preferably being selected to be a slave processor correspondent to that respective master. The master processor is adapted to process one or more messages in at least one of the data streams within the network. The messages may be sent directly (i.e. be addressed to) the master processor, or more preferably, they are multi-cast or broadcast throughout the network and are received by the one or more processors that are listening for them.

Upon receiving a message, the master processor preferably applies an application logic to the message, which processes the instruction(s) within the message to invoke a response, such as changing the state of, or updating, a prescribed data as part of a pipelined processing sequence. As part of the processing, the application logic creates a data structure in the form of a data packet, referred to herein as a "transaction unit", which preferably encapsulates a complete description of what changes/updates were made to the prescribed data as a result of the incoming message (e.g. 'triggering event'). In other words, the transaction unit maintains a summary or record of what it did to the data.

In addition to the record, the transaction unit also contains information relating to the incoming message, which triggered the response to change or update the prescribed data. In this way, the transaction unit contains a complete record of what transactional changes have been made and what triggering event brought about these changes. The transaction unit is also configured to include a new outgoing message for triggering a further event during the next step of the pipelined processing sequence. The instruction(s) within the outgoing message will, of course, depend on what changes have just been made and what is the intended/expected response at the next step and beyond etc. Therefore, if further processing is required the transaction unit is preferably consumed by the next stage of the application logic within the master processor.

A copy of the transaction unit is now also made available on the network as part of the data stream by preferably broadcasting the data packet, so that any interested processors can receive the data packet—of which one is at least the correspondent slave processor. A buffer within the slave processor is preferably configured to receive and store the transaction units that are made available by the master processor.

The application logic within the master processor thereafter continues to process each generated transaction unit as it proceeds through the pipelined processing sequence, recording changes/updates to the data in each successive transaction unit. Each transaction unit preferably being made available on the network to the slave processor and any other interested processors.

The correspondent slave processor is adapted to emulate the transactional state of the master processor by logically tracking, i.e. effectively "shadowing", the pipelined processing sequence of the master processor. However, in preferred embodiments, the emulation does not require any high degree of synchronicity with the master processor and consequently the slave may lag behind the master without any undue effects. Hence, a further advantage of the present invention is that relatively complex timing and/or coupling circuits are not required between the master and slave processors, unlike those found in dual processor fault-tolerant systems.

It is to be appreciated that the potential "lag" between the slave and the master processors may amount to several seconds or more, but is most preferably within a sub-second range, as obviously longer delays may hinder the performance and/or reliability of the architecture. In practice, the lag is dependent on the loading of the slave processor and upon the latency of the network itself. Hence, the lag will be greater when the slave is busy processing data and/or when there are large amounts of data traffic flowing through the network.

While the master processor is operating normally, that is when no "error event" has occurred on the master and/or has been detected by another processor, the slave processor enters into what is called a "logically inactive" state. By "logically inactive" we mean that the slave processor logically tracks the master processor by applying the same application logic to any received transaction units as that of the master, but the application logic is not regarded as being "activated" at that time. The result of this is that none of the transaction units generated by the slave processor, as a consequence of the emulation, are made available on the network while the master processor is operating normally. In this way, there can never be two identical transaction units on the network at the same time.

Moreover, it is very important to prevent the slave processor from applying its application logic while the master is operating normally, as the resulting logic is non-deterministic, and as a result the master and slave processors could bring about different changes of state in the data—even though the logic is the same and the inputs are nominally similar. Hence, if the slave processor were to simultaneously process equivalent threads of application logic to that of the master, it may still arrive at a different set of data/messages to the master, particularly where the application logic comprises time dependent parts. This is why the slave processor is prevented from multi-casting transaction units until such time that the master processor fails.

By "error event" we mean an error, fault or malfunction in the software and/or hardware of the master processor, brought about by a coding anomaly, component failure, loss of power, physical damage or destruction of the processor, or otherwise, which causes or results in an interruption or permanent cessation of the processing pipeline by the master processor. In other words, any event which halts the master processor from processing messages within the data stream.

The slave processor therefore tracks the transactional state of the master processor by regenerating the data stream as a result of processing the transaction units made available by the master processor. Since each transaction unit contains a record of what changes it made to a prescribed data, the slave processor is able to follow the changes/updates and apply these to its own equivalent data to thereby logically track the pipelined processing sequence of the master processor. To ensure that the slave processor accurately tracks the master processor, the slave regenerates the data stream by restoring the one or more messages in the same order in which they were originally created and/or processed by the master processor. This is preferably achieved by the slave processor asynchronously processing the one or more transaction units.

The application of transaction processing to regenerating a data stream is therefore particularly advantageous, as the original flow of data can be recreated or restored by the slave processor, irrespective of the end states or status of the processed data. In this way, the transaction units provide an advantageous mechanism by which the contents of a data stream may be regenerated without the need to re-set and/or re-send the data stream, which in real-time monitoring applications would not be desirable or indeed practical.

Not only does the regeneration of the data stream restore the original flow of data, it also preserves the dynamic state of the messages within the stream, which ensures that the result achieved by applying the application logic to the message is what was intended or expected when the original message was sent.

Should the master processor undergo an error event at some future point in time, and consequently cease processing, the slave processor acts to avoid any interruption in the data processing pipeline by continuing the data stream at the point were the master processor ceased operating. By processing the available transaction units placed on the network by the master processor, the slave processor emulates the transactional state of the master processor, which means that in the event of an error event occurring, it can rapidly assume control over the failing master processor.

In preferred embodiments, a monitoring protocol comprising the use of periodic "heartbeats" or "I'm alive" messages is implemented throughout the architecture, and such messages are passed between both the master and slave processors to confirm the presence and/or operation of each processor to the other. However, it is to be appreciated that any suitable form of monitoring protocol or processor detection technique (i.e. to check that a processor is "alive") may be used in conjunction with the present invention.

As discussed previously, the slave processor preferably resides in a logically inactive state during normal operation of the master processor. However, should the slave processor become aware that one or more of the heartbeat messages are absent or delayed beyond a predetermined interval of time, the slave processor preferably "releases" its application logic (i.e. marks the logic as being valid and activated) and begins to process any queued messages and consume remaining transaction units within the pipelined processing sequence. In so doing, it preferably asserts control over the failing master processor by appointing itself as the new master, and ensures that the flow of data within the data stream is not interrupted by generating one or more successive transaction units.

Since the application logic is now activated, the slave processor is permitted to make the successive transaction units available on the network for any other interested processors, thereby maintaining the integrity and continuity of the data stream despite the failure of the original master processor.

The slave processor is preferably configured to transmit a "kill" message to the master processor upon detecting an absent heartbeat, arising from an error event occurring on the master processor. Alternatively, and or additionally, the master processor itself may automatically shut down in response to detecting an error or malfunction in its operating procedure or processing pipeline, and may also shut down if it detects that a slave processor has become active (i.e. indicative of a failure associated with the master processor). In this way, the master processor can be removed from the processing pipeline as rapidly as possible, allowing the slave to take over from the point were the original master ceased operating.

The change of control between the master and slave processors preferably occurs substantially at "RAM speed", typically within several tens of milliseconds or faster following detection of the error event. Therefore, from an operator's point of view, the reconfiguration appears to be imperceptible and no interruption in the flow of data occurs. In other words, there appears to be a "virtually continuous" operation of the system. It has been found that the architecture and method of the present invention can deliver a "high availability" (i.e. system availability and resilience) of substantially 99.999%, which is sufficiently reliable and robust enough to allow its use in real-time monitoring and sensing applications within, for example, military and aviation environments. However, it is to be appreciated that the advantages of this invention are not dependent solely on the speed of the data recovery, but also in that it is the "completeness" of the recovery that is especially noteworthy, as the data stream can be restored in its entirety without any interruption or loss in the flow of data.

In accordance with each of the preferred embodiments of the present invention, the message and transaction unit processing is implemented within the middleware of the distributed architecture. Therefore, all of the "intelligence" required to handle the messages and transaction units is preferably embedded within one or more APIs (Application Programming Interfaces), which are designed to apply the technique of transaction processing to data that is in transit as part of a data stream. An advantage of embedding the intelligence within the middleware is to essentially hide the complexity of the hardware exploitation, which may also avoid or mitigate against middleware incompatibilities resulting from applications developed according to different development models.

To control the message handling, a known application design model called "Communication Sequential Processing" or "CSP" is preferably implemented as part of the present invention. CSP controls the flow of data by way of a communications based kernel which sends messages asynchronously throughout the communications network. The CSP control method is preferably implemented within the middleware APIs by way of an Object based methodology. However, it is to be appreciated that other development methodologies may alternatively be used to implement aspects of the present invention, without sacrificing any of the benefits or advantages of the architecture or method as disclosed herein.

Although the above embodiments have been described with reference to an architecture and method for maintaining the integrity of data streams in multi-pipelined processing environments, whereby it is essential to avoid the loss of data from within a stream, it should be appreciated that one or more of the principles of the invention may be used in other applications and data processing environments, where there is a need to regenerate a flow of data as a result of an error, system testing or calibration, or as part of general housekeeping routines etc.

Embodiments of the invention will now be described in detail by way of example and with reference to the accompanying drawings in which.

Figure 1:
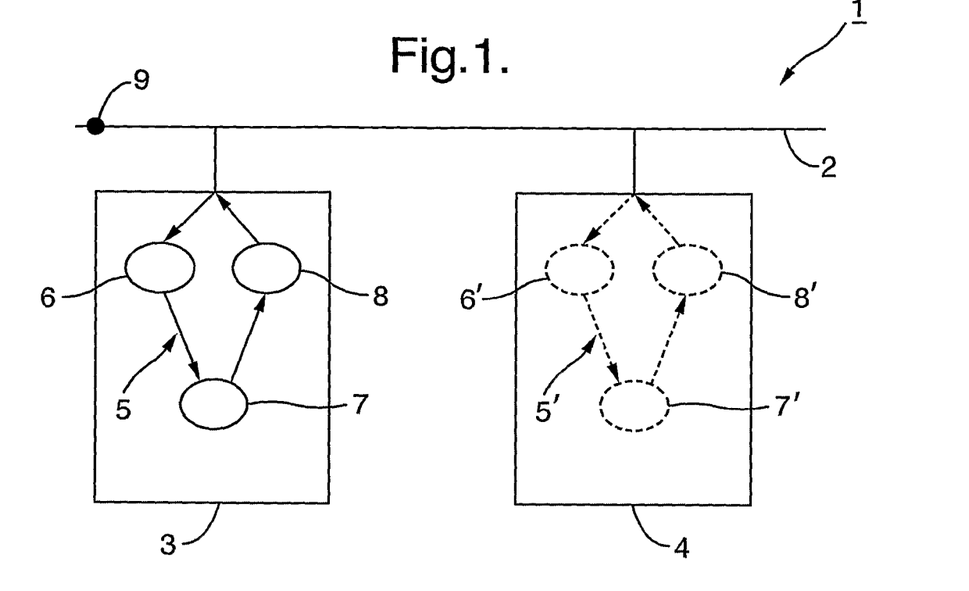
FIG. 1 is a schematic view of a distributed architecture according to a preferred embodiment of the present invention, showing a master processor and a slave processor connected to a communications network.

Referring to FIG. 1, there is shown a distributed architecture 1 according to an embodiment of the present invention, the architecture comprising a communications network 2, to which are connected a master processor 3 and a slave processor 4. The communications network 2 is a hardwire network, arranged according to a inter-meshed topology (not shown) and has sufficient bandwidth to carry a plurality of data streams, which originate from one or more real-time sensors, for example, radar or sonar detectors etc.

Both the master and slave processors 3, 4 are commercial-off-the-shelf workstations or PCs, which have been configured to process data streams within the pipelined processing environment of the distributed architecture 1. The master processor 3 is remotely located to that of the slave processor 4, so that they are physically or geographically separated. For example, the master processor 3 may be situated at the bow of a ship, while the slave processor 4 is located at the stern of the ship etc. Therefore, should one of the processors be damaged and/or rendered inoperative due to a localised event, the other processor should remain unharmed.

The slave processor 4 is selected to be correspondent to the master processor 3, and both are configured to include the same application logic for processing one or more data streams. A pipelined processing sequence 5 is shown schematically within the master processor 3, comprising a plurality (here three) functions 6, 7, 8 which are to be successively applied by the application logic to the flow of data within the data stream. Each function acts on the data to invoke a change and/or update to the data. Of course, it is to be understood that any number of functions may be included within the pipeline depending on how the data is to be processed.

A corresponding pipelined processing sequence 5' is also implemented within the slave processor 4, as shown in FIG. 1 (as ghost lining), which during normal operation is regarded as being "logically inactive", as explained in further detail below.

Although not shown in FIG. 1, the distributed architecture 1 may also include a plurality of other processors, each connected to the network 2 to receive and process respective data streams. A portion of the processors may be designated as master processors, with another portion being identified as slave processors, each slave being assigned to a respective master processor. Hence, it is to be understood that the example shown in FIG. 1 is readily scalable to suit the desired processing application and/or environment.

Figure 2:
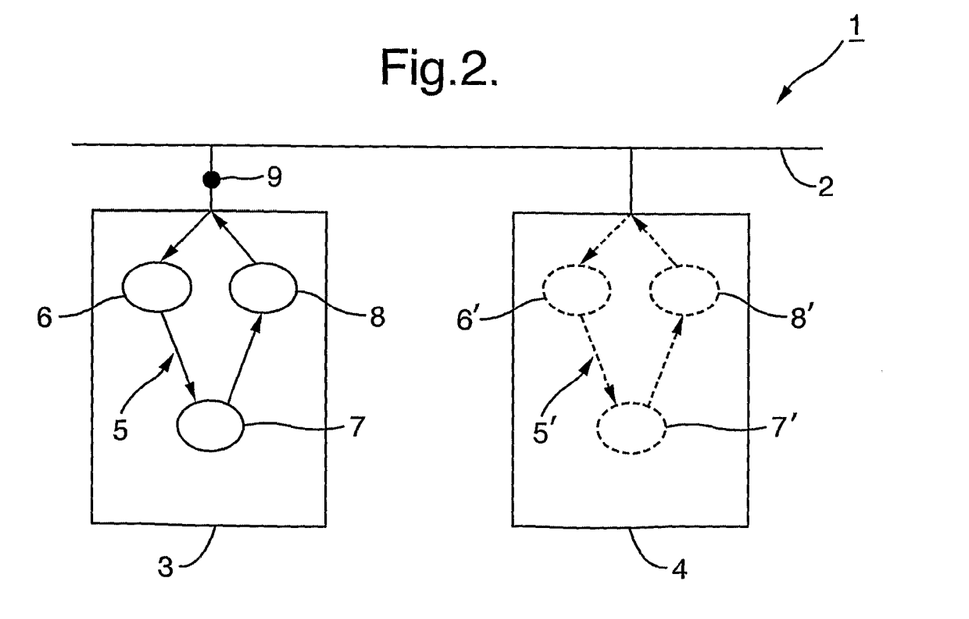
FIG. 2 is a schematic view of the distributed architecture of the preceding figure showing the master processor receiving a message as part of a data stream.

Referring now to FIGS. 1 and 2, there is shown a message 9, which has been sent via the network 2, as part of a data stream. The message 9 essentially corresponds to a "triggering event" that when acted upon by one or more of the functions 6, 7, 8 in the processing pipeline 5, generates some particular response or action within the master processor 3. In FIGS. 1 to 8, the processing pipeline is denoted generally by label '5', but it should be appreciated that the pipeline corresponds to the processing flow between functions 6, 7 and 8, as indicated by the arrows illustrated there between. The message handling in this example is controlled by a CSP data control method, implemented within the middleware APIs of the architecture, as a communications based kernel. The message 9 may be directly addressed to the master processor 3, or as in this example, has been multi-cast on the network 2 so that any interested processors can receive it.

Figure 3:
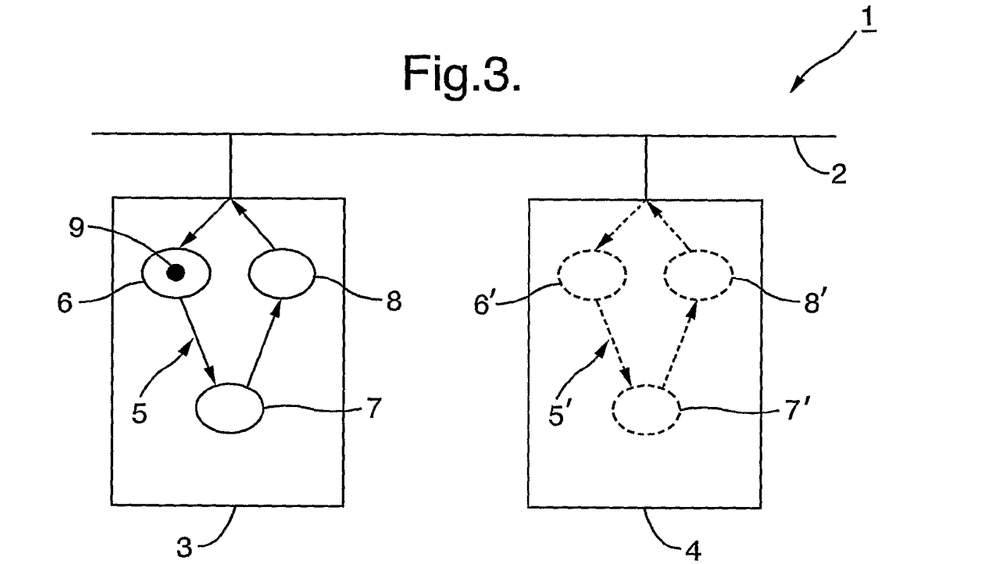
FIG. 3 is a schematic view of the distributed architecture of the preceding figure, showing the message being processed as part of a pipelined processing sequence.

As shown in FIG. 3, the message 9 enters the pipeline 5, within the master processor 3, and function 6 is then applied to the triggering message. The message 9 is processed by the application logic and proceeds to change and/or update an associated data, shown schematically as '10' in FIG. 4, in response to the message. As part of the message processing, the application logic creates a data structure in the form of a data packet 11, called a "transaction unit", which encapsulates a complete description of what changes/updates have been made to the data 10 as a result of the message 9. In this way, the transaction unit 11 maintains a summary or record of what response or action the message 9 invoked when processed by function 6 in the pipeline 5.

Figure 4:
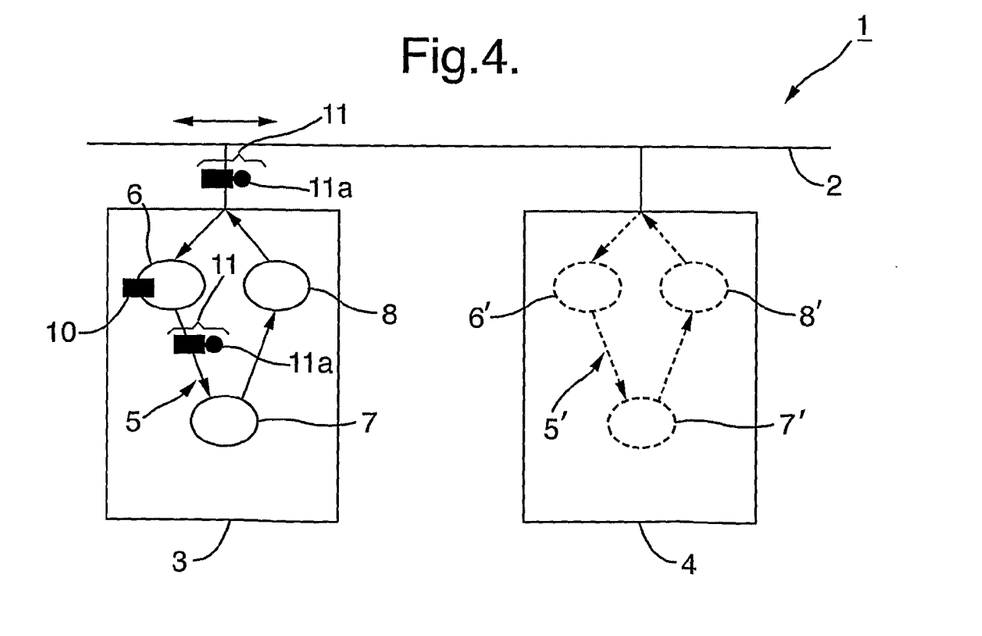
FIG. 4 is a schematic view of the distributed architecture of the preceding figure, showing the creation of a transaction unit as part of the pipelined processing sequence.

In addition to the summary or record, the transaction unit 11 also contains information relating to the triggering event and a new outgoing message 11a for triggering another event at the next step in the pipeline 5. The instructions within message 11a will depend on what changes/updates have just been made and what the intended/expected response should be along the processing pipeline 5.

At the time the transaction unit 11 is created, a copy of the transaction unit is also made available on the network 2 by the master processor 3, as shown in FIG. 4. The master processor 3 multi-casts the transaction unit 11 via the network 2 (as indicated by the bi-directional arrow in FIG. 4), so that any interested processors (particularly the slave processor 4) can receive it as part of the data stream.

Figure 5:
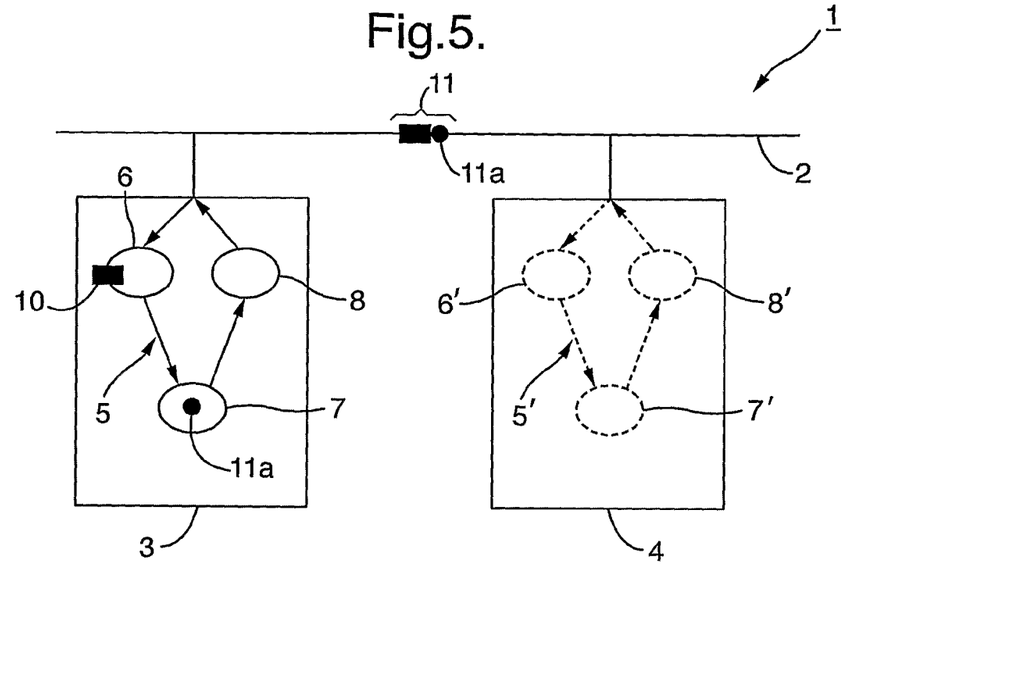
FIG. 5 is a schematic view of the distributed architecture of the preceding figure, showing the availability of the transaction unit on the communications network.
Figure 6:
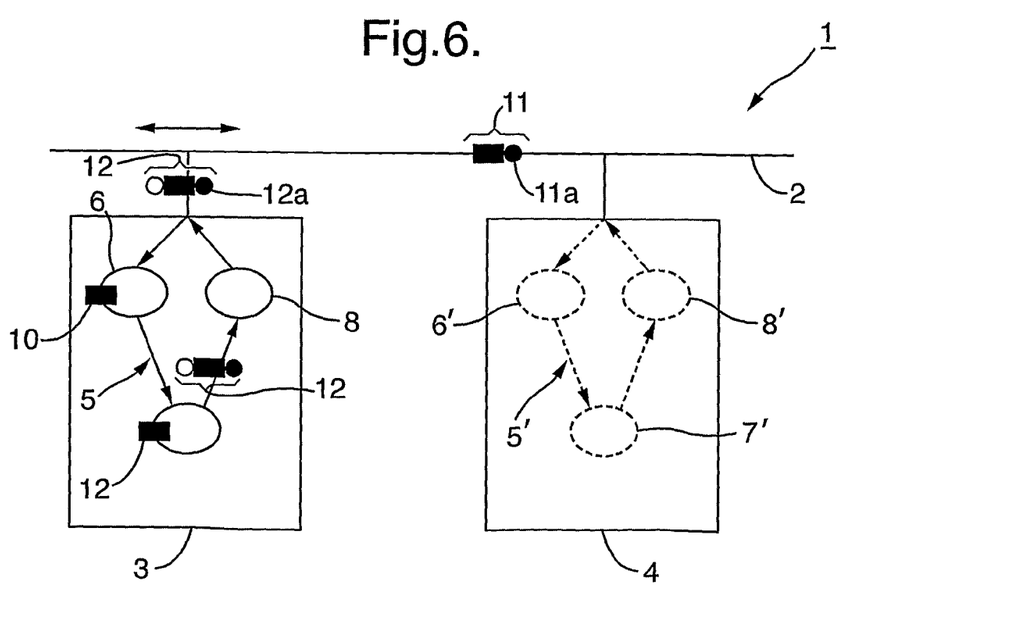
FIG. 6 is a schematic view of the distributed architecture of the preceding figure, showing the creation of a further transaction unit as part of the pipelined processing sequence.

The pipeline 5 continues to process the data stream by consuming the transaction unit 11, and processing message 11a by applying it to function 7, as shown in FIG. 5. Once again, the message 11a acts as a triggering event and causes the application logic to change and/or update an associated data 12, as indicated in FIG. 6. As before, another transaction unit 12 is created, which encapsulates a complete description of the changes/updates to the data 12 in response to message 11a, while a copy of the transaction unit 12 is multi-cast via the network 2.

Figure 7:
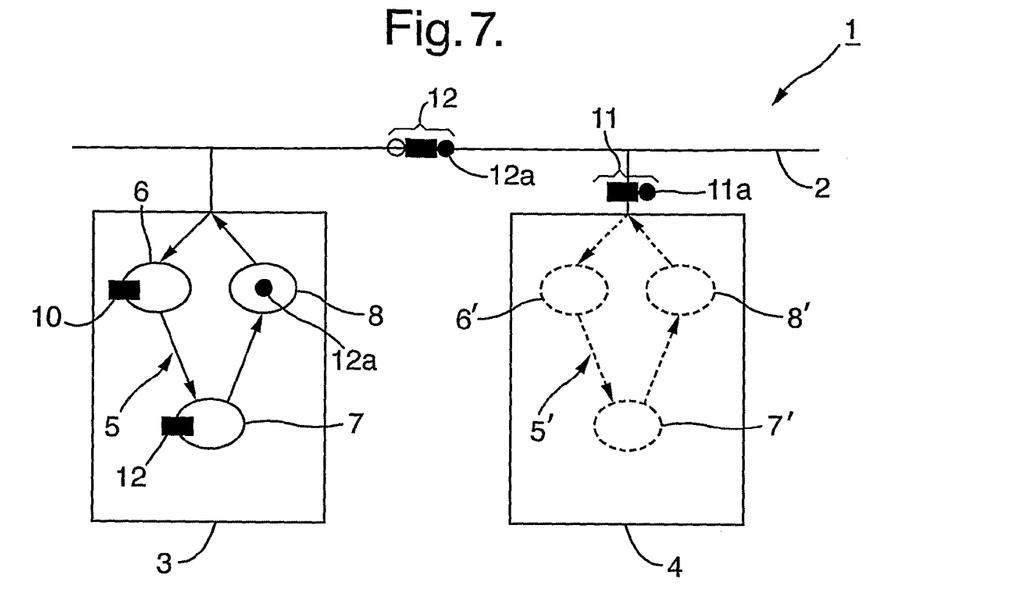
FIGS. 7 & 8 are schematic views of the distributed architecture of the preceding figure, showing the slave processor receiving the transaction units over the network.
Figure 8:
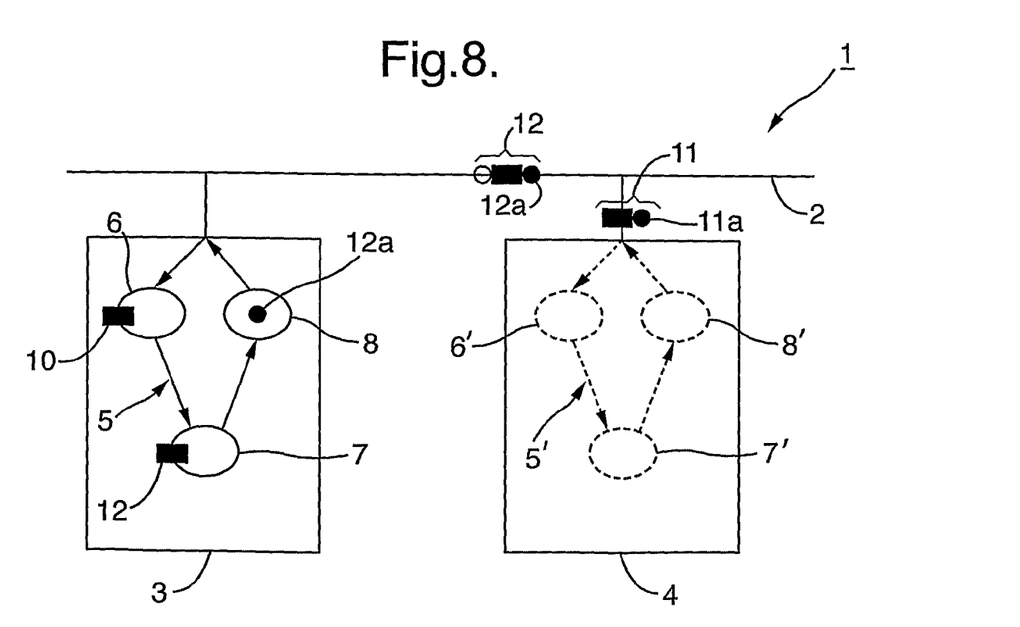

The new transaction unit 12 is consumed by the application logic as it progresses through the pipeline 5, such that function 8 is then applied to message 12a, as shown in FIGS. 7 & 8. All the while, the multi-cast copies of the transaction units 11, 12 are propagating through the network 2 and are being received by the slave processor 4.

Figure 9:
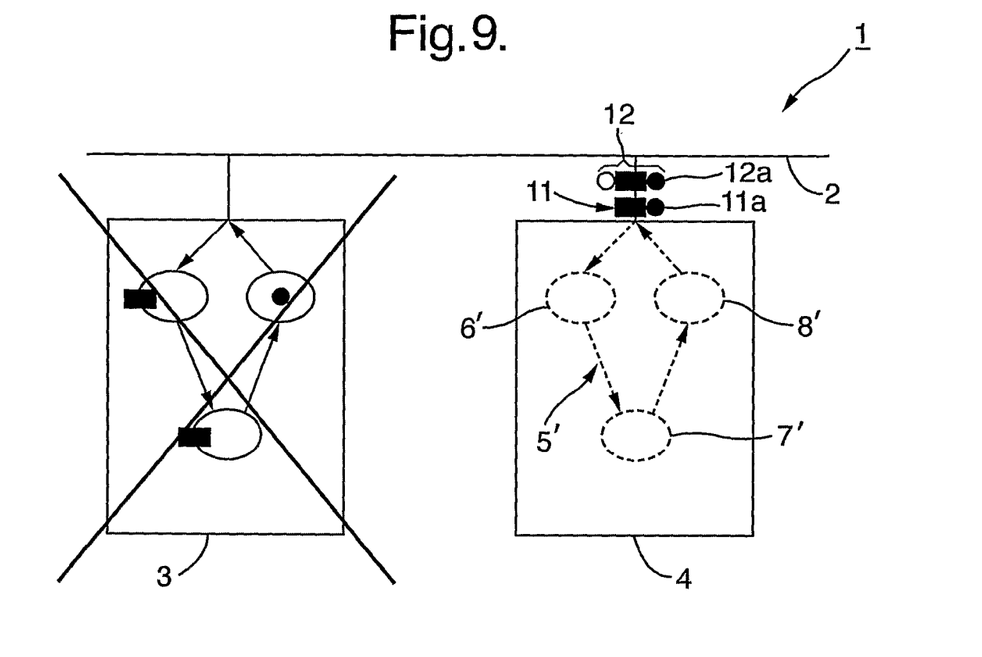
FIG. 9 is a schematic view of the distributed architecture of the preceding figures, showing an error event occurring on the master processor.

However, at the time the transaction unit 12 is consumed by the application logic of pipeline 5, and function 8 is applied to message 12a, the master processor 3 experiences an error event, in this example a fatal power loss, which renders the processor inoperative, as shown in FIG. 9. As a result, all processing halts on the master processor 3 and no further transaction units are multi-cast to the network 2.

The slave processor 4 has no knowledge of the error event at the time the event occurs, and therefore proceeds to continue with its instructions to emulate the transactional state of the master processor 3. The slave processor 4 achieves this emulation by logically tracking, i.e. effectively "shadowing", the pipelined processing sequence carried out within the master processor 3 (as shown in FIGS. 3 to 8). Therefore, the slave processor 4 proceeds to process any transaction units received via the network 2 from the master processor 3, including any that have been stored in its conventional FIFO (First In, First Out) type buffer. As shown in FIG. 9, the transaction units 11, 12 have arrived at the slave processor 4 and have been queued in the processor's buffer (not shown).

During normal operation of the master processor 3, the application logic within the slave processor 4 is deemed to be "logically inactive". In other words, although the pipeline 5' is fully functional, the application logic is not formally "activated" and consequently the slave processor 4 is blocked from sending any copies of its transaction units via the network 2. However, despite the status of the application logic, slave processor 4 is able to track the transactional state of the master processor 3, by processing the one or more transaction units 11, 12.

Figure 10:
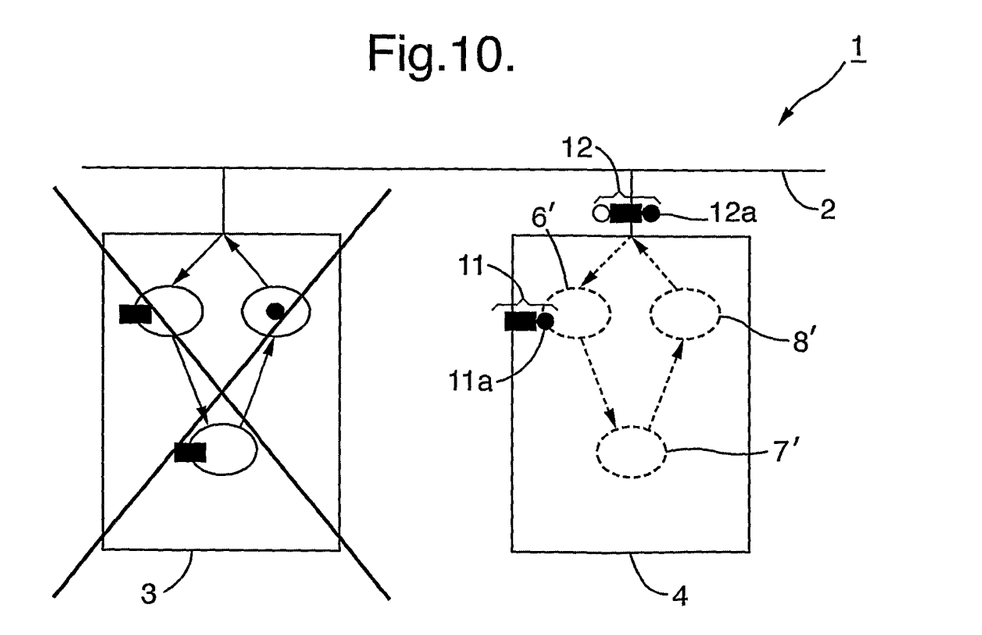
FIGS. 10 to 13 are schematic views of the distributed architecture of the preceding figure, showing the slave processor logically tracking the pipelined processing sequence of the master processor.
Figure 11:
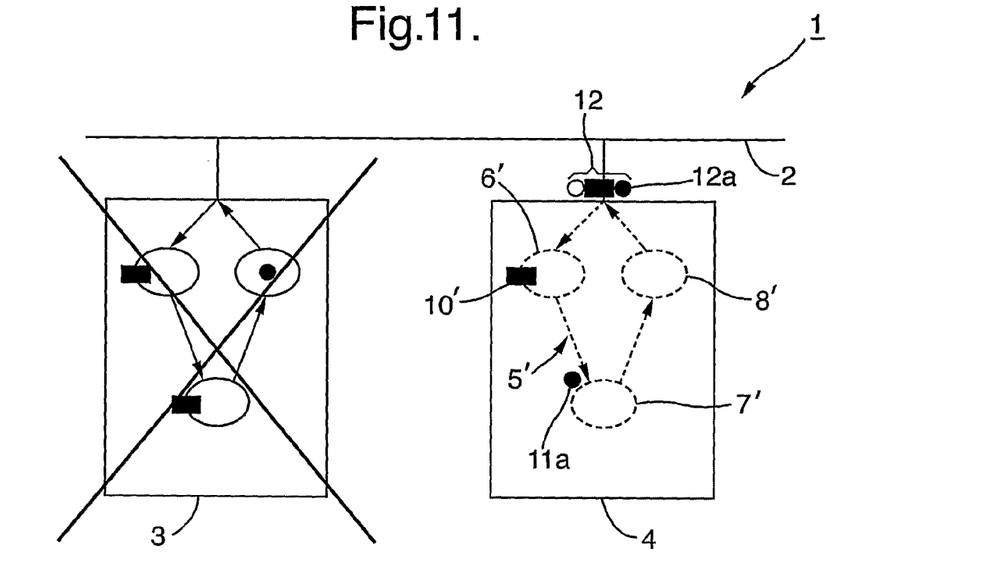
Figure 12:
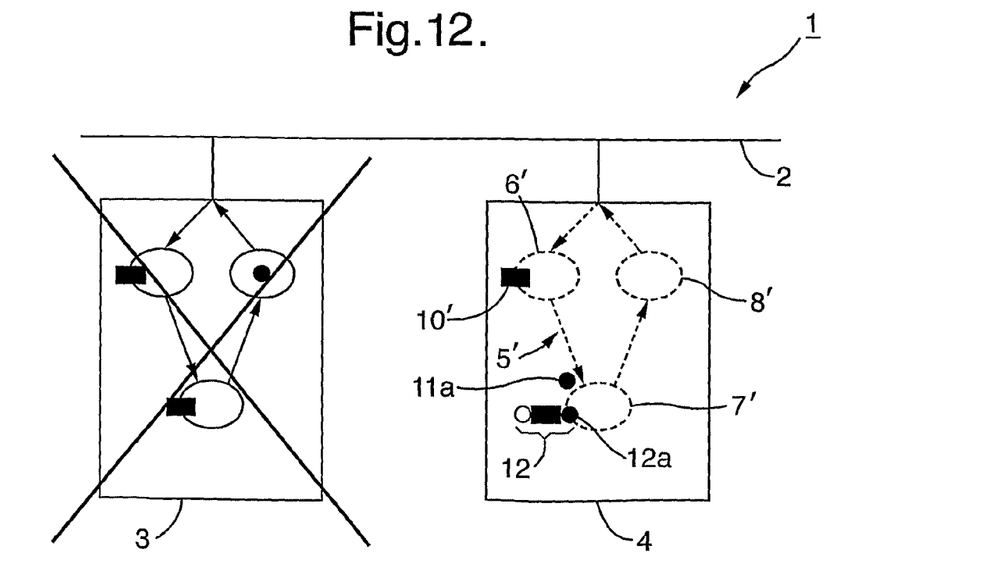

The slave processor 4 tracks the transactional state of the master processor 3 by regenerating the data stream as a result of consuming the transaction units 11, 12. Since each transaction unit contains a record of what changes it made to the data 10, 12, the slave processor 4 is able to follow the changes/updates and apply these to its own equivalent data. Therefore, as shown in FIGS. 10 and 11, transaction unit 11 is applied to function 6', which results in data 10' being changed/updated in accordance with the changes/updates to data 10. However, there is now no need to process the released message 11a, as transaction unit 12 can instead be simply consumed by function 7' to change/update data 12', as shown in FIGS. 12 and 13, with any released messages, such as message 11a, being queued within the slave processor 4.

Hence, it is clear that the slave processor 4 is able to regenerate the original data stream by restoring the messages in the same order in which they were originally created and/or processed by the master processor 3. Moreover, as each transaction unit contains a complete description as to how the data was changed/update, asynchronously processing the transaction units in the order in which they are received, allows the slave processor 4 to align itself with the transactional state of the master processor 3.

Figure 13:
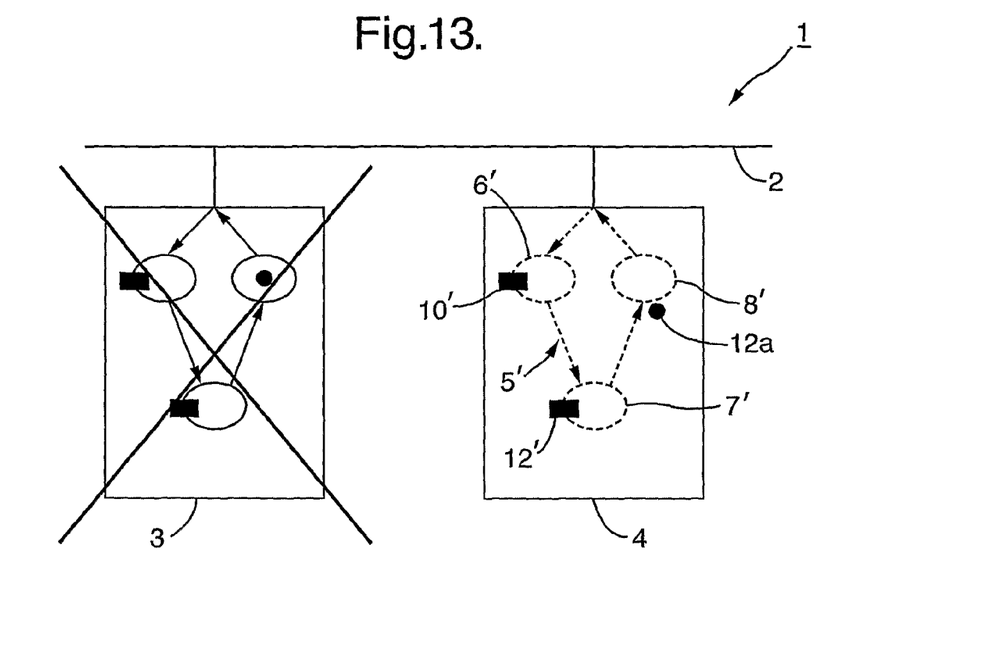
Figure 14:
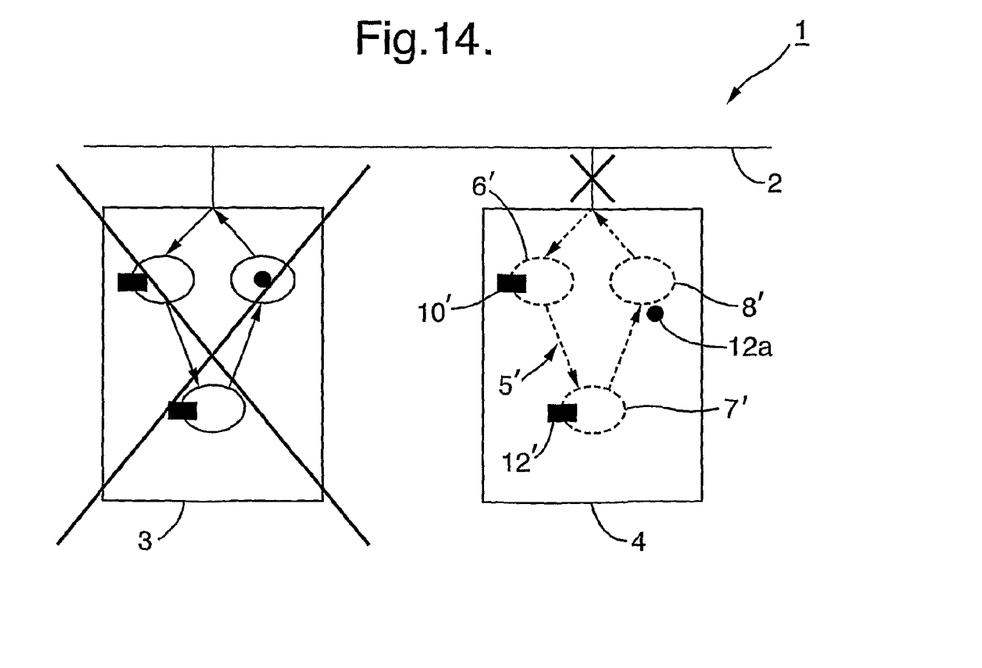
FIGS. 14 & 15 are schematic views of the distributed architecture of the preceding figures, showing the detection of the failing master processor and change of control between the master and slave processors.

In FIG. 13, the message released from consuming transaction unit 12, i.e. message 12a, is queued by the application logic in anticipation of a further transaction unit from the master processor 3. However, as shown in FIG. 14, the slave processor 4 eventually becomes aware that the master processor 3 has experienced an error event, due to an absent "heartbeat" message expected from the master processor 3 (indicated schematically as crossed lines on the input to the slave). Whereupon, the slave processor 4 acts to assume control over the failed master processor 3 and, importantly, to avoid any interruption in the flow of data within the data stream.

Figure 15:
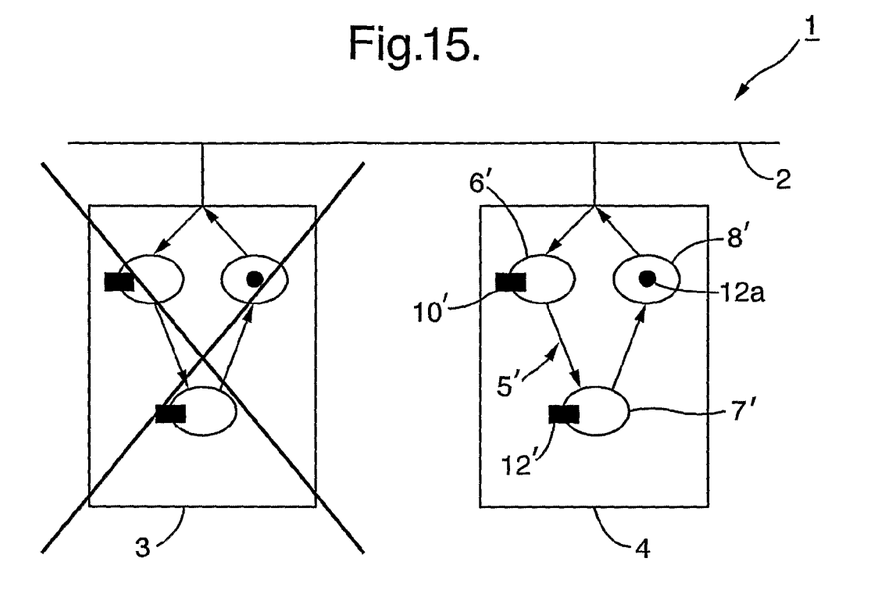

At the point where the slave processor 4 becomes aware that the master processor 3 has failed, the slave processor 4 automatically activates its application logic and begins to process any queued messages in the pipeline 5'. Therefore, as shown in FIG. 15, the pipeline 5' (now indicated by solid lines) processes the previously queued message 12a and the application logic removes the block on sending transaction units via the network 2. At this point, the slave processor 4 becomes the new master processor.

The new master processor 4 also sends a kill message to the original master processor 3 to ensure that it shuts down completely, even if it appears that the original master processor 3 has already ceased operating. In this way, the original master processor 3 can be removed from the processing pipeline as rapidly as possible, while allowing the new master processor 4 to assert control over it.

A comparison of FIGS. 8 and 15 reveals that the new master processor 4 is now in the same transactional state as the original master processor 3 was just before the error event. Therefore, as a result of restoring the original messages within both the data stream and processing pipeline, the new master processor 4 has aligned its data with that of the original master processor 3.

Figure 16:
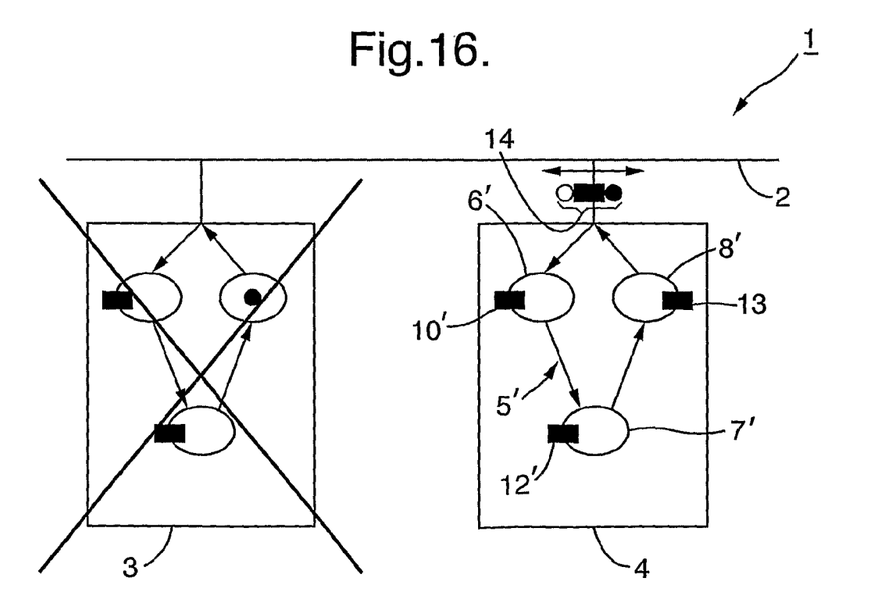
FIG. 16 is a schematic view of the distributed architecture of the preceding figures, showing the new master (previous slave) processor maintaining the flow of data by generating a successive transaction unit.

Referring to FIGS. 15 & 16, the application logic now applies function 8' to the message 12a, which enables data 13 to be changed and/or updated, the details of which are encapsulated within a new transaction unit 14 that is made available to the network 2 by the new master processor 4. In this way, there is no interruption in the flow of data within the architecture 1, as the new master processor 4 continues from the exact point where the failed master processor ceased operating. As a result, the architecture is able to maintain the integrity of the data stream, without any loss of data.

The change of control between the master and former slave processors 3, 4 occurs substantially at "RAM speed" upon detection of the missed heartbeat. Therefore, from an operator's point of view, the reconfiguration is imperceptible and there is consequently negligible or no change in the availability of the system.

The above embodiments are described by way of example only. Many variations are possible without departing from the invention.

The invention claimed is:

1. A distributed architecture configured to maintain the integrity of data streams within a multi-pipelined processing environment, the architecture comprising:
   a communications network for carrying a plurality of data streams;
   a master processor adapted to process one or more messages in at least one of the data streams, the message processing including the creation of one or more data packets within the at least one data stream, each packet encapsulating a transaction unit for the message processing, the transaction unit including the message that triggered the message processing, a description of changes or updates to data made as a result of the message processing and a message configured to trigger subsequent processing; and
   at least one slave processor adapted to emulate the transactional state of the master processor by regenerating the at least one data stream as a result of processing the one or more data packets by storing the description of changes or updates to the data made as a result of the message processing and storing the message configured to trigger subsequent processing in a processing queue, whereupon in response to an error event on the master processor, the slave processor acts to avoid interrupting the at least one data stream by generating one or more successive data packet(s) using only data previously received from the master processor.

2. The distributed architecture as in claim 1, wherein the slave processor is configured to regenerate the at least one data stream by restoring the one or more messages.

3. The distributed architecture as in claim 2, wherein the slave processor is configured to restore the one or more messages in the same order in which they were originally created and/or processed.

4. The distributed architecture as in claim 1, wherein the regeneration of the at least one data stream preserves the dynamic state of the one or more messages.

5. The distributed architecture as in claim 1, wherein the slave processor is configured to asynchronously process the one or more data packets.

6. The distributed architecture as in claim 1, wherein the slave processor is further configured to make any successive data packets available on the communications network as part of the at least one data stream.

7. The distributed architecture as in claim 1, wherein the master processor is configured to automatically shut-down in response to the error event.

8. The distributed architecture as in claim 1, wherein the slave processor is configured to assume control over the master processor in response to detecting the error event.

9. The distributed architecture as in claim 8, wherein the slave processor is arranged to assume control over the master processor within substantially several tens of milliseconds of the error event being detected.

10. The distributed architecture as in claim 1, wherein the slave processor is configured to be logically inactive until the error event is detected.

11. The distributed architecture as in claim 1, wherein the message and/or packet handling is implemented within the middleware of the multi-pipelined processing environment.

12. The distributed architecture as in claim 1, wherein the communications network has an inter-meshed topology.

13. The distributed architecture as in claim 1, wherein the at least one data stream includes information from one or more data sources.

14. The distributed architecture as in claim 1, wherein the architecture further comprises a plurality of processors, with a portion acting as master processors and another portion acting as slave processors, with at least one slave processor associated with each master processor.

15. The distributed architecture as in claim 1, wherein the slave processor is configured to delete a stored message configured to trigger subsequent processing from the processing queue after a subsequent transaction unit is received from the master processor.

16. A method of maintaining the integrity of data streams within a multi-pipelined processing environment, implemented across a distributed architecture, the method comprising the steps of:
   carrying a plurality of data streams on a communications network;
   processing, on a master processor, one or more messages in at least one of the data streams, the processing including the creation of one or more data packets within the at least one of the data streams, each packet encapsulating a transaction unit for the message processing, the transaction unit including the message that triggered the message processing, a description of changes or updates to data made as a result of the message processing and a message configured to trigger subsequent processing; and
   emulating, on at least one slave processor, the transactional state of the master processor by regenerating the at least one of the data streams as a result of processing the one or more data packets storing the description of changes or updates to the data made as a result of the message processing and storing the message configured to trigger subsequent processing in a processing queue, whereupon in response to an error event on the master processor, the slave processor acts to avoid interrupting the at least one of the data streams by generating one or more successive data packet(s) using only data previously received from the master processor.

17. The method as in claim 16, wherein regenerating the at least one of the data streams comprises the step of restoring the one or more messages.

18. The method as in claim 17, wherein the step of restoring restores the one or more messages in the same order in which they were originally created and/or processed.

19. The method as in claim 16, wherein regenerating the at least one of the data streams preserves the dynamic state of the one or more messages.

20. The method as in claim 16, wherein the one or more data packets are processed asynchronously.

21. The method as in claim 16, further comprising the step of making any successive data packets available on the communications network as part of the at least one of the data streams.

22. The method as in claim 16, further comprising the step of transferring control from the master processor to the slave processor in response to detecting the error event.

23. The method as in claim 16, further comprising the step of receiving information from one or more data sources as one or more data streams.

* * * * *